United States Patent
Anegawa

(10) Patent No.: US 12,023,830 B2
(45) Date of Patent: Jul. 2, 2024

(54) SHAPING DEVICE AND SHAPED OBJECT MANUFACTURING METHOD

(71) Applicant: Seiko Epson Corporation, Tokyo (JP)

(72) Inventor: Kenta Anegawa, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 17/360,039

(22) Filed: Jun. 28, 2021

(65) Prior Publication Data
US 2021/0402657 A1 Dec. 30, 2021

(30) Foreign Application Priority Data
Jun. 29, 2020 (JP) .................. 2020-111324

(51) Int. Cl.
| | | |
|---|---|---|
| B29C 45/00 | (2006.01) | |
| B29C 45/47 | (2006.01) | |
| B29C 45/74 | (2006.01) | |
| B29C 64/188 | (2017.01) | |
| B29C 64/314 | (2017.01) | |
| B29C 64/357 | (2017.01) | |

(52) U.S. Cl.
CPC .......... B29C 45/0055 (2013.01); B29C 45/47 (2013.01); B29C 45/74 (2013.01); B29C 2045/0058 (2013.01); B29C 64/188 (2017.08); B29C 64/314 (2017.08); B29C 64/357 (2017.08); B29C 2793/0027 (2013.01)

(58) Field of Classification Search
CPC ........ B29C 64/171–194; B29C 64/357; B29C 64/30; B33Y 40/00
See application file for complete search history.

(56) References Cited

U.S. PATENT DOCUMENTS

| | | | |
|---|---|---|---|
| 5,942,168 A | 8/1999 | Ichikawa et al. | |
| 9,902,115 B1* | 2/2018 | Janson | ............... B29B 17/0005 |
| 2004/0089980 A1* | 5/2004 | Owada | ................... B33Y 10/00 |
| | | | 425/375 |

(Continued)

FOREIGN PATENT DOCUMENTS

| | | |
|---|---|---|
| JP | H07-205156 A | 8/1995 |
| JP | 2004-017632 A | 1/2004 |
| WO | 2020-094391 A1 | 5/2020 |

OTHER PUBLICATIONS

Newman, Process planning for additive and subtractive manufacturing technologies, CIRP Annals, vol. 64, Issue 1, May 11, 2015 (accessed Apr. 7, 2023), pp. 467-470, https://www.sciencedirect.com/science/article/pii/S0007850615001171 (Year: 2015).*

(Continued)

*Primary Examiner* — Philip C Tucker
*Assistant Examiner* — Andrew L Swanson
(74) *Attorney, Agent, or Firm* — Harness, Dickey & Pierce, P.L.C.

(57) ABSTRACT

A shaping device includes a cutting unit configured to cut a first shaped product or an intermediate component formed by adding a shaping material to the first shaped product on a stage, and a control unit configured to control the cutting unit to cut the first shaped product or the intermediate component to shape a shaped object different from the first shaped product and the intermediate component.

8 Claims, 7 Drawing Sheets

(56) References Cited

U.S. PATENT DOCUMENTS

| | | | |
|---|---|---|---|
| 2015/0298211 A1* | 10/2015 | Abe | B22F 3/24 |
| | | | 419/28 |
| 2019/0061243 A1* | 2/2019 | Saito | B29B 7/823 |
| 2019/0217532 A1* | 7/2019 | Schroeder | B29C 64/393 |
| 2020/0139693 A1* | 5/2020 | Nielsen-Cole | B29C 64/218 |
| 2021/0394441 A1* | 12/2021 | Rzadkowski | B29C 48/72 |
| 2022/0010253 A1 | 1/2022 | Bendall et al. | |

OTHER PUBLICATIONS

Carrier, 7 Major Technologies in 3D Printing, Bridgr, Jan. 18, 2018 (accessed Apr. 11, 2023), https://insights.bridgr.co/7-major-technologies-3d-printing/ (Year: 2018).*

Grzesik, Hybrid manufacturing of metallic parts integrated additive and subtractive processes, 2018, Mechanik, vol. 91 No. 7, p. 468-475, DOI: https:ljdoi.org/10.17814/mechanik.2018.7.58 (Year: 2018).*

APSX, LLC., Ho to Use 3D Printed Molds on APSX-PIM Plastic Injection Machine, Apr. 20, 2018 (accessed Oct. 5, 2023), YouTube, https://www.youtube.com/watch?v=aCIKSL4saHQ (Year: 2018).*

CADimensions, Inc., How Berker uses 3D printed injection molds, Jun. 3, 2016 (accessed Oct. 5, 2023), YouTube, https://www.youtube.com/watch?v=I2eXShR58XU (Year: 2016).*

\* cited by examiner

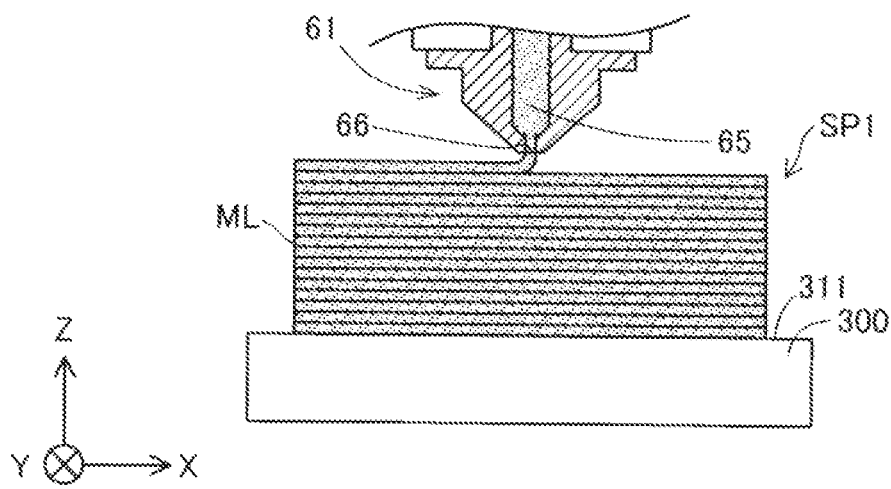
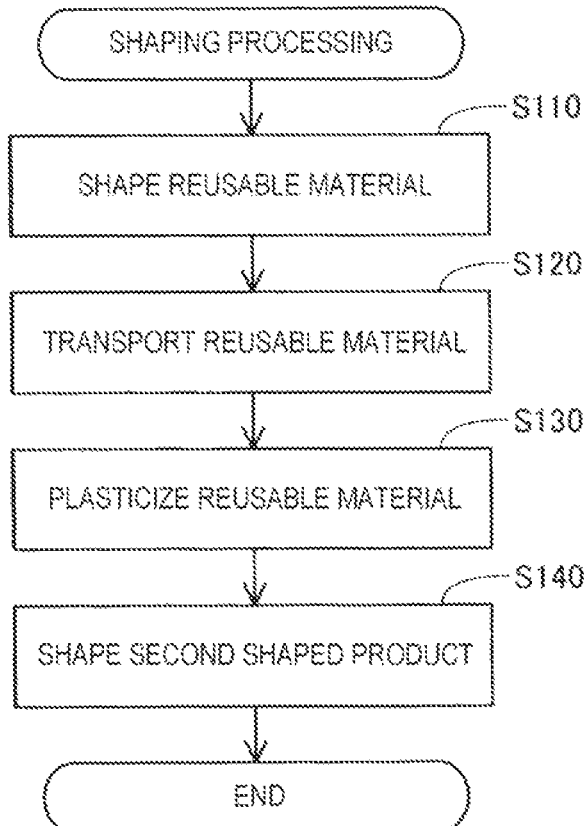

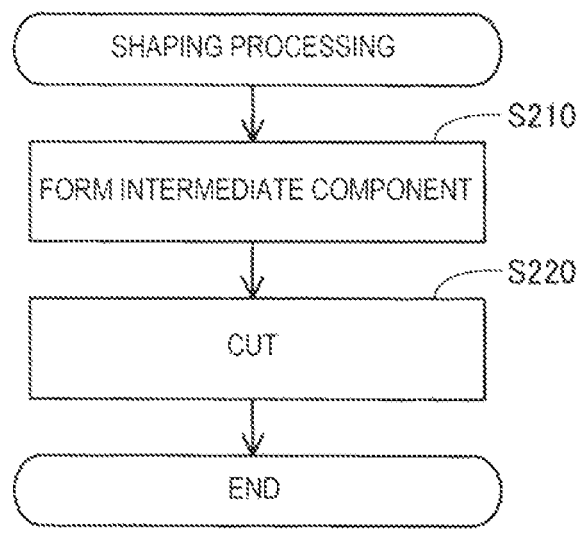
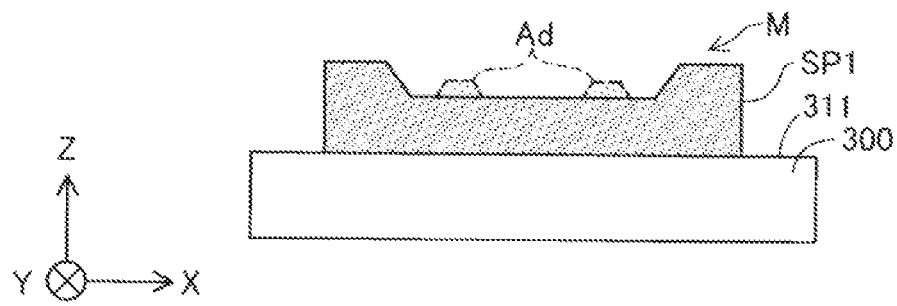
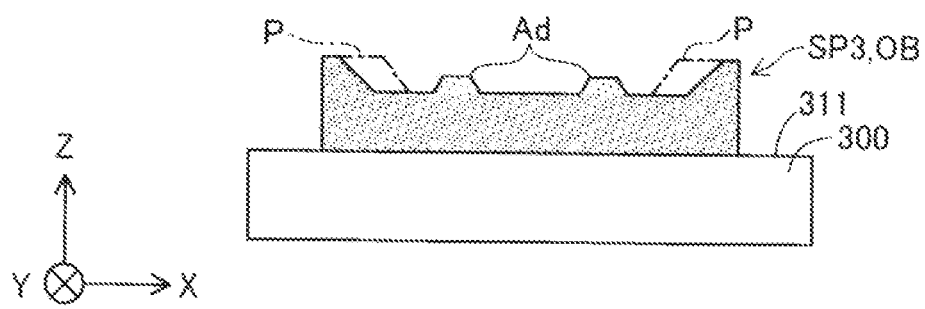

SHAPING DEVICE AND SHAPED OBJECT MANUFACTURING METHOD

The present application is based on, and claims priority from JP Application Serial Number 2020-111324, filed Jun. 29, 2020, the disclosure of which is hereby incorporated by reference herein in its entirety.

BACKGROUND

1. Technical Field

The present disclosure relates to a shaping device and a shaped object manufacturing method.

2. Related Art

Regarding a device for shaping a shaped object, JP-A-2004-17632 discloses a technique of shaping a shaped object from a foaming agent, and then performs pulverizing to eliminate the shaped object. Further, a technique is disclosed in which the shaped object is dissolved by a dissolving agent such that the shaped object is eliminated and is reused as a raw material for shaping a new shaped object.

However, in the technique disclosed in JP-A-2004-17632, when the shaped object is eliminated by pulverizing, the shaped object cannot be reused as the raw material. Further, when the shaped object is reused as the raw material, a process of separating the dissolving agent from a liquid material obtained by dissolving the shaped object is required. Therefore, there is a demand for a technique capable of easily reusing the shaped object.

SUMMARY

According to a first aspect of the present disclosure, a shaping device is provided. The shaping device includes: a cutting unit configured to cut a first shaped product or an intermediate component formed by adding a shaping material to the first shaped product on a stage; and a control unit configured to control the cutting unit to cut the first shaped product or the intermediate component to shape a shaped object different from the first shaped product and the intermediate component.

According to a second aspect of the present disclosure, a shaped object manufacturing method is provided. The manufacturing method includes: cutting, by a cutting unit, a first shaped product or an intermediate component formed by adding a shaping material to the first shaped product on a stage; and shaping a shaped object different from the first shaped product and the intermediate component.

BRIEF DESCRIPTION OF THE DRAWINGS

FIG. 6 is a diagram showing a state in which a shaping material is discharged in the pre-shaping processing.

FIG. 7 is a process diagram showing shaping processing according to a first embodiment.

FIG. 9 is a process diagram showing shaping processing according to a second embodiment.

FIG. 10 is a diagram showing a state in which a shaping material is added to the first shaped product.

FIG. 11 is a diagram showing a second shaped product shaped by the shaping processing according to the second embodiment.

DESCRIPTION OF EXEMPLARY EMBODIMENTS

A. First Embodiment

Figure 1:
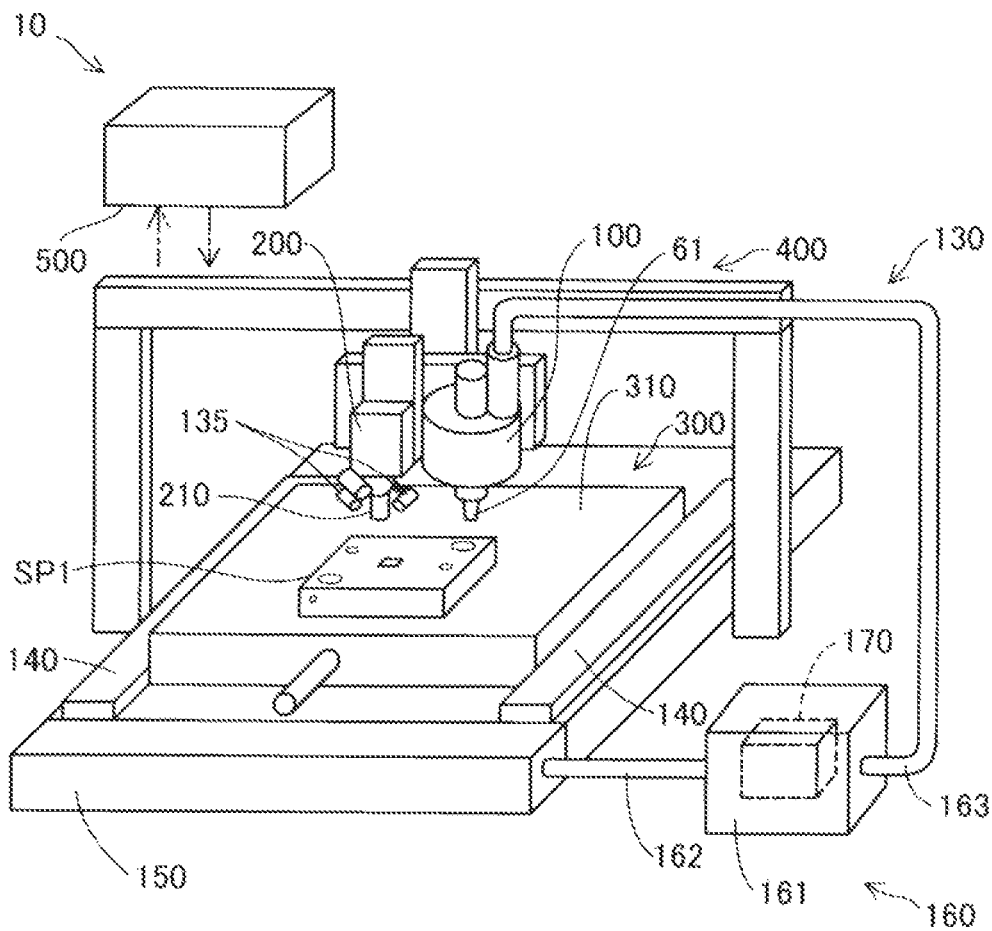
FIG. 1 is a diagram showing a schematic configuration of shaping device.

FIG. 1 is a diagram showing a schematic configuration of a shaping device 10 in the present embodiment. FIG. 1 shows arrows along X, Y, and Z directions orthogonal to each other. The X, Y, and Z directions are directions along an X axis, a Y axis, and a Z axis, which are three spatial axes orthogonal to each other, and each include a direction toward one side and another direction opposite thereto along the X axis, the Y axis, and the Z axis. The X axis and the Y axis are axes along a horizontal plane, and the Z axis is an axis along a vertical line. The other figures also show arrows along the X, Y, and Z directions as appropriate. The X, Y, and Z directions in FIG. 1 and the X, Y, and Z directions in other figures represent the same directions. In the following description, when an orientation is specified, "+" indicates a positive direction, "−" indicates a negative direction, and positive and negative symbols are used together to indicate directions.

The shaping device 10 includes a discharge unit 100, a cutting unit 200, a stage 300, a movement mechanism 400, a control unit 500, a transport unit 130, and a selecting unit 170. In the shaping device 10, under control of the control unit 500, a cutting tool 210 attached to the cutting unit 200 is rotated, and the movement mechanism 400 is driven to change a relative position between the cutting tool 210 and the stage 300, so that a first shaped product SP1, which is a shaped product, or an intermediate component formed by adding a shaping material to the first shaped product SP1 on the stage 300 is cut to shape a shaped object OB, which is a shaped object different from the first shaped product SP1 and the intermediate component.

The shaped product refers to a finished object or a component having a portion shaped for the purpose of using a shape thereof. The shaped product is, for example, a molding die used for injection molding, a model used for design study, various machine components, design products, and the like, and is shaped by, for example, the shaping device according to the present embodiment, an injection molding device, or another shaping device. The shaped object refers to not only a shaped product but also a so-called material, raw material, and the like generated for the purpose of being processed and used. Therefore, for example, when it is described that "the control unit 500 shapes the shaped object OB by cutting the first shaped product SP1", the control unit 500 may shape a shaped product different from the first shaped product SP1 as the shaped object OB, or may shape the material, the raw material, and the like as the shaped object OB.

When it is described that "the shaped object OB is different from the first shaped product SP1", a shape or a constituent material of the shaped object OB is different from a shape or a constituent material of the first shaped product SP1. For example, when the shaped object OB is a material shaped from the first shaped product SP1, since the shape of the shaped object OB and the shape of the first shaped product SP1 are different from each other, the shaped object OB and the first shaped product SP1 are different from each other. Further, when a part of the first shaped product SP1 is removed by cutting and the shaped product is shaped as the shaped object OB, the first shaped product SP1 and the shaped object OB are different from each other due to the difference in shape. Further, when a part of the first shaped product SP1 is cut and a material different from a material constituting the cut portion is added to the cut portion, and a shaped object OB having the same shape as the first shaped product SP1 is shaped, the first shaped product SP1 and the shaped object OB are different from each other due to the difference in material. When the shapes of the first shaped product SP1 and the shaped object OB are different from each other and the constituent materials of the first shaped product SP1 and the shaped object OB are also different from each other, these two are different from each other. The same applies to a case when it is described that "the shaped object OB is different from the intermediate component".

Further, in the shaping device 10 according to the present embodiment, under the control of the control unit 500, the movement mechanism 400 is driven to change a relative position between a nozzle 61 provided in the discharge unit 100 and the stage 300 while discharging a shaping material from the nozzle 61 to a shaping surface 310 on the stage 300, so that the shaping material is stacked on the stage 300.

The cutting unit 200 is a cutting device that cuts the first shaped product on the stage 300 by rotating the cutting tool 210 attached to a shaft at a head distal end. As the cutting tool 210, for example, a flat end mill, a ball end mill, a face mill, and the like can be used. The cutting unit 200 of the present embodiment is configured such that a plurality of cutting tools 210 can be replaced by an automatic tool changer (ATC) (not shown) depending on, for example, a cutting target, a cutting purpose, and the like. The cutting unit 200 detects a position of a distal end of the cutting tool 210 by a general position detection sensor, and transmits a detection result to the control unit 500. The control unit 500 uses the detection result to control a relative positional relationship between the cutting tool 210 and the stacked shaping material by the movement mechanism 400 to be described later to perform the cutting. Further, the cutting unit 200 may include a static eliminator such as an ionizer.

The movement mechanism 400 moves the discharge unit 100 and the stage 300, and the cutting unit 200 and the stage 300 to change a relative position between the discharge unit 100 and the stage 300, and the relative position between the cutting unit 200 and the stage 300. Accordingly, a relative position of the nozzle 61 provided in the discharge unit 100 with respect to the shaping surface 310 of the stage 300, and a relative position of the cutting unit 200 with respect to the shaping surface 310 of the stage 300 are changed. The change in the relative position of the nozzle 61 with respect to the shaping surface 310 may be simply referred to as movement of the nozzle 61. Similarly, the change in the relative position of the cutting unit 200 with respect to the shaping surface 310 may be simply referred to as movement of the cutting unit 200.

The movement mechanism 400 in the present embodiment moves the discharge unit 100 and the cutting unit 200 along the X direction and the Z direction and moves the stage 300 along the Y direction by a driving force of three motors. Each motor is driven under the control of the control unit 500. The movement mechanism 400 may be configured to move the stage 300 without moving the discharge unit 100 and the cutting unit 200. Further, the movement mechanism 400 may be configured to move the discharge unit 100 and the cutting unit 200 without moving the stage 300.

Figure 2:
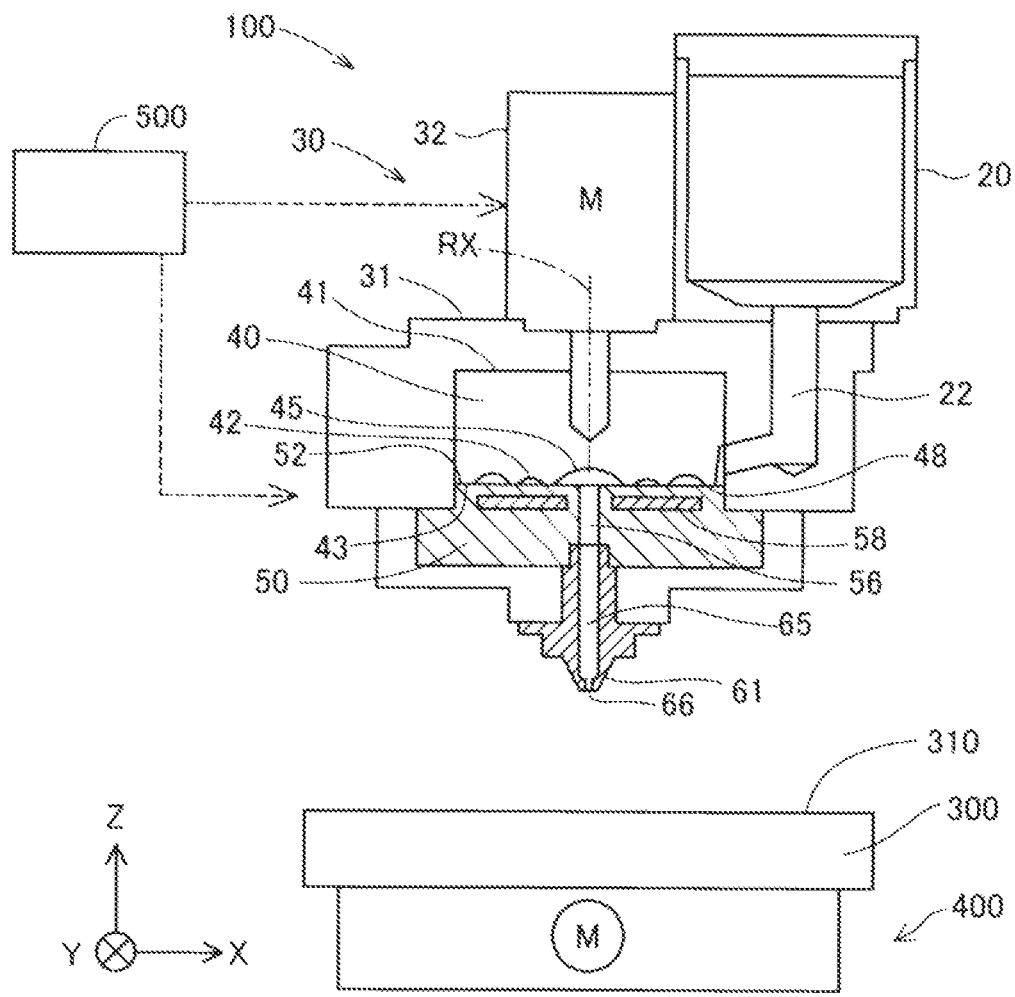
FIG. 2 is an explanatory diagram showing a schematic configuration of a discharge unit.

FIG. 2 is an explanatory diagram showing a schematic configuration of the discharge unit 100 in the present embodiment. The discharge unit 100 includes a material supply unit 20, a plasticizing unit 30, and the nozzle 61.

The material in a state of pellets, powder, and the like is put into the material supply unit 20. As the material, a commercially available material or a reusable material to be described later is used. In the present embodiment, a pellet-shaped ABS resin is used as the commercially available material. Details of the material that can be used in the shaping device 10 will be described later. The material supply unit 20 in the present embodiment includes a hopper. The material supply unit 20 and the plasticizing unit 30 are coupled by a communication path 22 provided under the material supply unit 20. The material put into the material supply unit 20 is supplied to the plasticizing unit 30 via the communication path 22.

The plasticizing unit 30 includes a rotor case 31, a drive motor 32, a rotor 40, a barrel 50, and a heater 58. The plasticizing unit 30 plasticizes at least a part of the material in a solid state supplied from the material supply unit 20 to form a shaping material in a paste shape having fluidity, and supplies the shaping material to the nozzle 61. A term "plasticize" means that heat is applied to a thermoplastic material to melt the material. The term "melt" means not only that the thermoplastic material is heated to a temperature equal to or higher than a melting point to be liquefied, but also that the thermoplastic material is heated to a temperature equal to or higher than a glass transition point to be softened, thereby exhibiting the fluidity. The rotor 40 may be referred to as a scroll, a flat screw, or simply a screw.

The rotor 40 is accommodated in the rotor case 31. The drive motor 32 is fixed to an upper surface of the rotor case 31. A rotation shaft of the drive motor 32 is coupled to an upper surface 41 of the rotor 40. The drive motor 32 may not be directly coupled to the rotor 40. For example, the rotor 40 and the drive motor 32 may be coupled via a speed reducer. In this case, for example, the drive motor 32 may be coupled to a planetary gear of a speed reducer including a planetary gear mechanism, and the rotor 40 may be coupled to a sun gear.

The rotor 40 has a substantially columnar shape whose height in a direction along a central axis RX is smaller than a diameter. The rotor 40 is disposed in the rotor case 31 such that the central axis RX is parallel to the Z direction. The rotor 40 rotates around the central axis RX in the rotor case 31 by torque generated by the rotation of the drive motor 32.

The rotor 40 has a groove forming surface 48 on a side opposite to the upper surface 41 in the direction along the central axis RX. Grooves 42 are formed in the groove forming surface 48. A detailed shape of the groove forming surface 48 of the rotor 40 will be described later with reference to FIG. 3.

The barrel 50 is provided under the rotor 40. The barrel 50 has a facing surface 52 facing the groove forming surface 48 of the rotor 40. A communication hole 56 is provided at a center of the facing surface 52. The shaping material generated by the plasticizing unit 30 is supplied to the nozzle 61 via the communication hole 56. A detailed shape of the facing surface 52 will be described with reference to FIG. 4.

The heater 58 heats the material supplied between the rotor 40 and the barrel 50. The heater 58 of the present embodiment is embedded in the barrel 50. An output of the heater 58 is controlled by the control unit 500. In the other embodiments, for example, the heater 58 may be provided in contact with the barrel 50 without being embedded in the barrel 50, or may be provided in the rotor 40.

The nozzle 61 is provided below the barrel 50. A nozzle flow path 65 and a nozzle hole 66 are formed in the nozzle 61. The nozzle flow path 65 communicates with the communication hole 56 of the plasticizing unit 30. The nozzle hole 66 is a portion in which a flow path cross section provided at an end portion of the nozzle flow path 65 on a side communicating with an atmosphere is reduced. The shaping material supplied to the nozzle flow path 65 from the plasticizing unit 30 is discharged from the nozzle hole 66.

Figure 3:
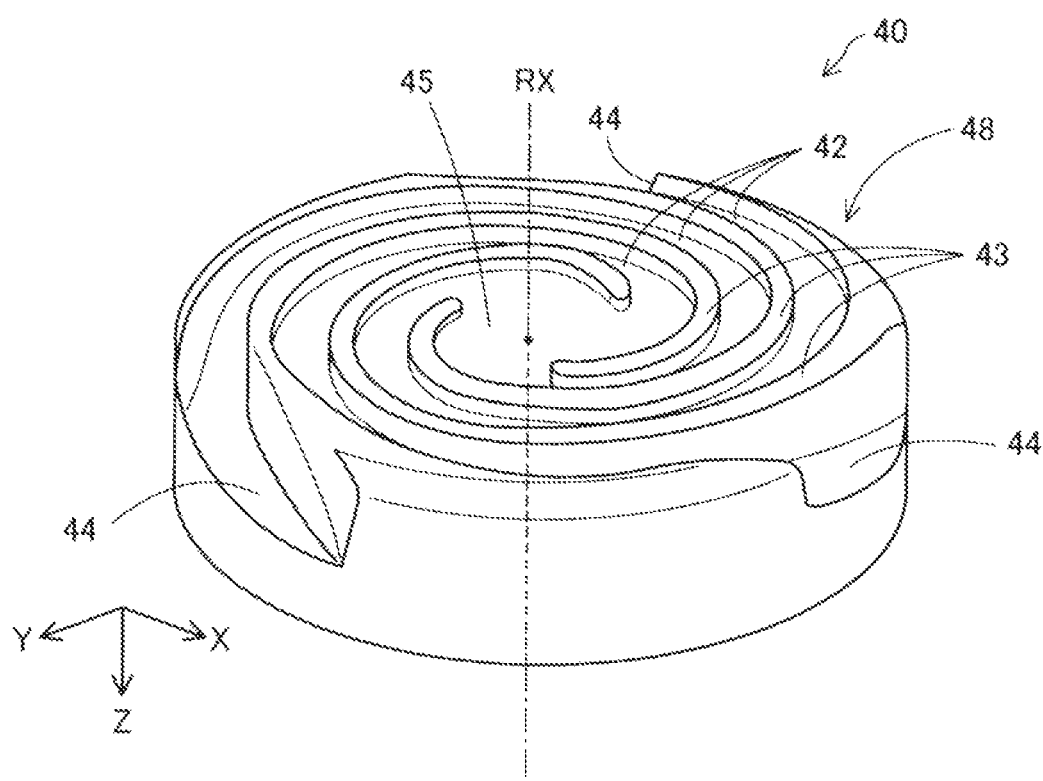
FIG. 3 is a schematic perspective view showing a configuration of a lower surface side of a rotor.

FIG. 3 is a schematic perspective view showing a configuration of a lower surface side of the rotor 40. A lower surface of the rotor 40 refers to the groove forming surface 48 described above. FIG. 3 shows a position of the central axis RX of the rotor 40 by a one-dot chain line. The grooves 42 are provided on the lower surface of the rotor 40 facing the barrel 50.

A central portion 45 of the groove forming surface 48 of the rotor 40 is configured as a recessed portion to which one end of each groove 42 is coupled. The central portion 45 faces the communication hole 56 of the barrel 50. The central portion 45 intersects the central axis RX.

The grooves 42 of the rotor 40 constitute so-called scroll grooves. The grooves 42 extend in a spiral shape so as to draw an arc from the central portion 45 to an outer periphery of the rotor 40. The grooves 42 may be configured to extend in an involute curve shape or a spiral shape. The groove forming surface 48 is provided with ridge portions 43 that constitute side wall portions of the grooves 42 and extend along each groove 42. The grooves 42 are continuous to a material inlet 44 formed in a side surface of the rotor 40. The material inlet 44 is a portion where the material supplied via the communication path 22 of the material supply unit 20 is received.

FIG. 3 shows an example of the rotor 40 including three grooves 42 and three ridge portions 43. The number of the grooves 42 or the ridge portions 43 provided in the rotor 40 is not limited to three. The rotor 40 may be provided with only one groove 42, or may be provided with two or more grooves 42. Further, the number of the provided ridge portions 43 may be optional in accordance with the number of the grooves 42.

FIG. 3 shows an example of the rotor 40 in which the material inlets 44 are formed at three positions. The number of material inlets 44 provided in the rotor 40 is not limited to three. In the rotor 40, the material inlet 44 may be provided at only one position, or may be provided at two or more positions.

Figure 4:
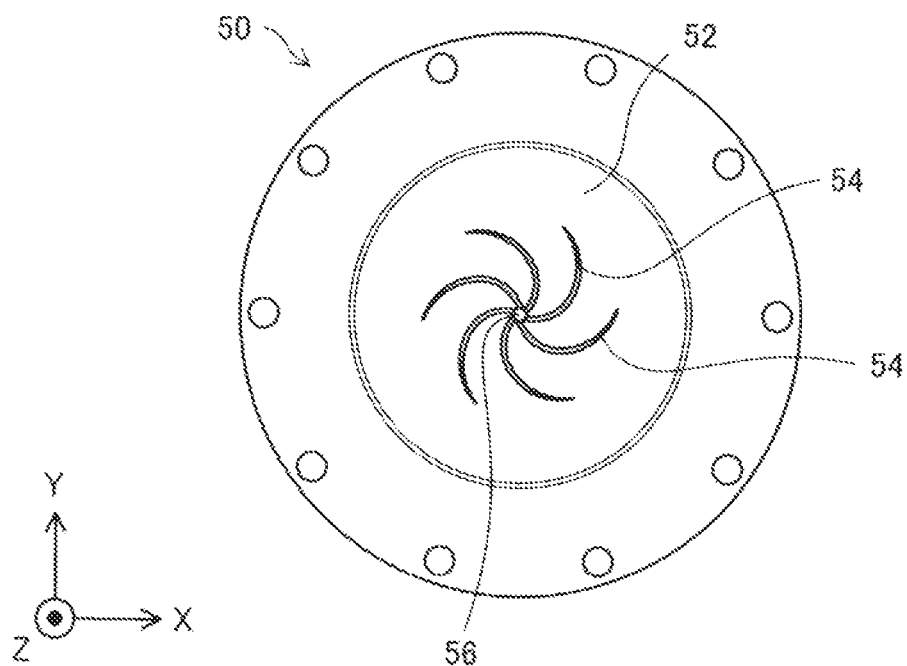
FIG. 4 is a schematic plan view showing a configuration of an upper surface side of a barrel.

FIG. 4 is a schematic plan view showing a configuration of an upper surface side of the barrel 50. An upper surface of the barrel 50 is the facing surface 52 described above. The facing surface 52 has a substantially circular shape. The communication hole 56 described above is formed at the center of the facing surface 52. A plurality of guide grooves 54 are formed around the communication hole 56 in the facing surface 52. One end of each guide groove 54 is coupled to the communication hole 56, and each guide groove 54 extends in a spiral shape from the communication hole 56 to an outer periphery of the facing surface 52. Each of the guide grooves 54 has a function of guiding the shaping material to the communication hole 56. The guide grooves 54 may not be formed in the barrel 50.

When the rotor 40 rotates, the material supplied from the material inlets 44 is guided to the grooves 42, and moves toward the central portion 45 while being heated in the grooves 42. At this time, the material is plasticized by the heat of the heater 58 as it approaches the central portion 45, and is converted into the shaping material. The shaping material collected in the central portion 45 flows out to the nozzle 61 via the communication hole 56 by an internal pressure generated in the central portion 45. In this way, the plasticizing unit 30 can plasticize the material by the heat of the heater 58 while conveying the material toward the communication hole 56 by the rotation of the rotor 40 between the rotor 40 and the barrel 50. Therefore, for example, compared to an in-line screw, even when heat generated by shearing of the material is small, the material is easily plasticized in a stable manner. Therefore, for example, even when the material is a fine powder, the material can be stably plasticized by the plasticizing unit 30.

The transport unit 130 transports a reusable material to be described later to the plasticizing unit 30. As shown in FIG. 1, the transport unit 130 includes a blower 135, conveyor units 140, a recovery unit 150, and a pressure feeding unit 160, and is configured to transport a cutting powder and the like formed on the stage 300 to the plasticizing unit 30. It should be noted that the transport unit 130 may be configured to transport the reusable material to the plasticizing unit 30, and in other embodiments, for example, the transport unit 130 may not include a part of the above-described configuration, or may include a transport device different from the above-described configuration.

The blower 135 is an air blower that blows air to the stage 300. The conveyor unit 140 includes two conveyors provided in a +X direction and a −X direction of the stage 300. The recovery unit 150 is a box-shaped container that is provided adjacent to the conveyor units 140 in a −Y direction and has an elongated shape in the X direction. The recovery unit 150 is provided below the conveyor units 140 and opens in a +Z direction. The pressure feeding unit 160 includes a main body portion 161, a first tube 162, and a second tube 163. The main body portion 161 includes a suction device that suctions the cutting powder and the like from the recovery unit 150, and a compressor that pressure-feeds the cutting powder and the like to the material supply unit 20 together with compressed air. The first tube 162 is a flexible tube that couples the recovery unit 150 and the main body portion 161. The second tube 163 is a flexible tube that couples the main body portion 161 and the material supply unit 20. For example, a mechanism for purging the compressed air may be provided at a coupling portion between the second tube 163 and the material supply unit 20.

The selecting unit 170 is a member for selecting a size of the reusable material to be described later. The selecting unit 170 of the present embodiment is provided inside the main body portion 161 of the pressure feeding unit 160 as a part of the transport unit 130. The selecting unit 170 includes a filter. When the cutting powder and the like are pressure-fed from the recovery unit 150 to the material supply unit 20, the cutting powder and the like pass through the filter, and a size of the cutting powder is selected according to a size of a mesh of the filter. The selecting unit 170 may be provided with, for example, a plurality of filters. Further, the selecting unit 170 may not be provided in the main body portion 161, for example, may be provided in a middle of the conveyor unit 140 or may be provided independently of the transport unit 130. Further, the selecting unit 170 may select the size of the cutting powder and the like by, for example, a centrifugal force caused by an air flow, and a combination of a filter and the centrifugal force caused by the air flow.

The control unit 500 is implemented by a computer including one or more processors, a main storage device, and an input and output interface that inputs and outputs signals to and from an outside. In the present embodiment, the control unit 500 exerts various functions including the shaping processing by the processor executing a program or a command read into the main storage device. The control unit 500 may be configured with a combination of a plurality of circuits instead of the computer.

The shaping processing refers to processing for manufacturing a shaped object OB. The shaping processing is executed by the control unit 500 when a start operation of the shaping processing is performed by a user on an operation panel provided in the shaping device 10 or a computer coupled to the shaping device 10.

In the present embodiment, the control unit 500 executes the shaping processing to shape the reusable material as the shaped object OB. The reusable material is a material obtained by cutting a first shaped product SP1 or an intermediate component. Further, before the execution of the shaping processing, the control unit 500 executes pre-shaping processing in order to shape the first shaped product SP1, and shapes the first shaped product SP1.

Figure 5:
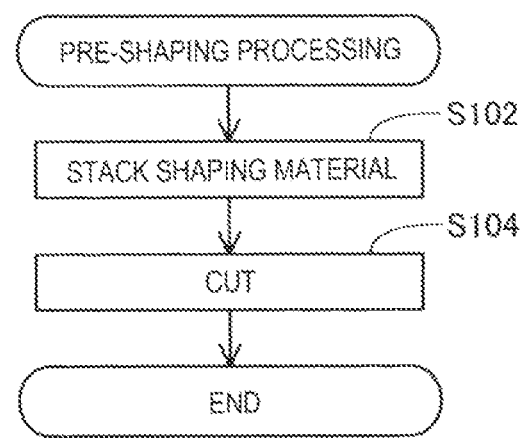
FIG. 5 is a process diagram showing a pre-shaping processing.

FIG. 5 is a process diagram showing the pre-shaping processing. In step S102, the control unit 500 controls the discharge unit 100 to stack the shaping material on the stage 300. Specifically, under control of the control unit 500, the plasticizing unit 30 plasticizes the pellet-shaped ABS resin as the material to generate the shaping material, the generated shaping material is discharged from the nozzle 61 to the stage 300 to solidify the shaping material, and the shaping material is stacked on the stage 300. The solidification of the shaping material means that the shaping material discharged from the discharge unit 100 loses fluidity. In the present embodiment, the shaping material is thermally contracted by being cooled, loses plasticity, and is solidified.

FIG. 6 is a diagram showing a state in which the shaping material is discharged in step S102. As shown in FIG. 6, by executing step S102, the shaping material is stacked on the stage 300, and a layer ML of the shaping material is formed.

In step S104, the control unit 500 controls the cutting unit 200 to cut a part of the shaping material on the stage 300. In step S104, for example, a side surface of the layer ML of the shaping material shown in FIG. 6 is cut.

As in steps S102 and S104, the control unit 500 of the present embodiment shapes the shaped product according to discharge data and cutting data when controlling the discharge unit 100 and the cutting unit 200 to shape the shaped product. Therefore, before the execution of steps S102 and S104, the control unit 500 acquires the discharge data and the cutting data from, for example, another computer coupled to the shaping device 10. The discharge data is data representing a discharge path which is a movement path through which the nozzle 61 moves while discharging the shaping material. The discharge data includes, for example, line width data of the shaping material in the discharge path. The cutting data is data representing a cutting path which is a movement path through which the cutting tool 210 moves while cutting the shaped shaping material. The cutting path data includes, for example, a target value of the number of rotations of the cutting tool 210 and a target value of a feed speed of the cutting tool 210. For example, the control unit 500 may generate the discharge path and the cutting path based on shape data of a shaped product to be shaped. In this case, the shaping device 10 may include a computer that generates the discharge path and the cutting path in addition to the control unit 500.

By executing steps S102 and S104, the first shaped product SP1 is shaped. The control unit 500 may shape the first shaped product SP1 by, for example, repeatedly executing steps S102 and S104 as appropriate. Further, when the shaping device 10 includes, for example, a heating unit such as the heater that heats the discharged shaping material and a cooling unit such as the air blower that cools the discharged shaping material, the control unit 500 may control the heating unit or the cooling unit to heat or cool the shaping material, so as to perform stacking and cutting of the shaping material while adjusting the fluidity of the shaping material.

In the present embodiment, the molding die used in the injection molding device is shaped as the first shaped product SP1. Therefore, the first shaped product SP1 of the present embodiment is formed with, for example, an uneven shape and the like for forming a cavity for determining a shape of a molded object molded by the injection molding device. Further, as described above, the first shaped product SP1 of the present embodiment is shaped by the ABS resin. That is, the first shaped product SP1 contains a thermoplastic resin.

FIG. 7 is a process diagram showing the shaping processing in the present embodiment. As described above, in the present embodiment, the shaping processing is executed after the pre-shaping processing shown in FIG. 5. The shaping processing may not be executed immediately after the shaping of the first shaped product SP1, and may be executed, for example, after the first shaped product SP1 is used as the molding die in the injection molding device. In this case, for example, the first shaped product SP1 is placed on the stage 300 by the user before step S110. Further, the first shaped product SP1 at this time may be, for example, thermally degraded, or a part thereof may be broken.

In step S110, the control unit 500 controls the cutting unit 200 to cut the first shaped product SP1 and shape the reusable material as the shaped object OB. In the present embodiment, the control unit 500 cuts all of the first shaped product SP1 in step S110, but in other embodiments, only a part of the first shaped product SP1 may be cut to shape the reusable material. Further, in step S110, the control unit 500 may shape the reusable material by cutting all or a part of the intermediate component. In this case, for example, before step S110, the control unit 500 adds the shaping material to the first shaped product SP1 to form the intermediate component.

Figure 8:
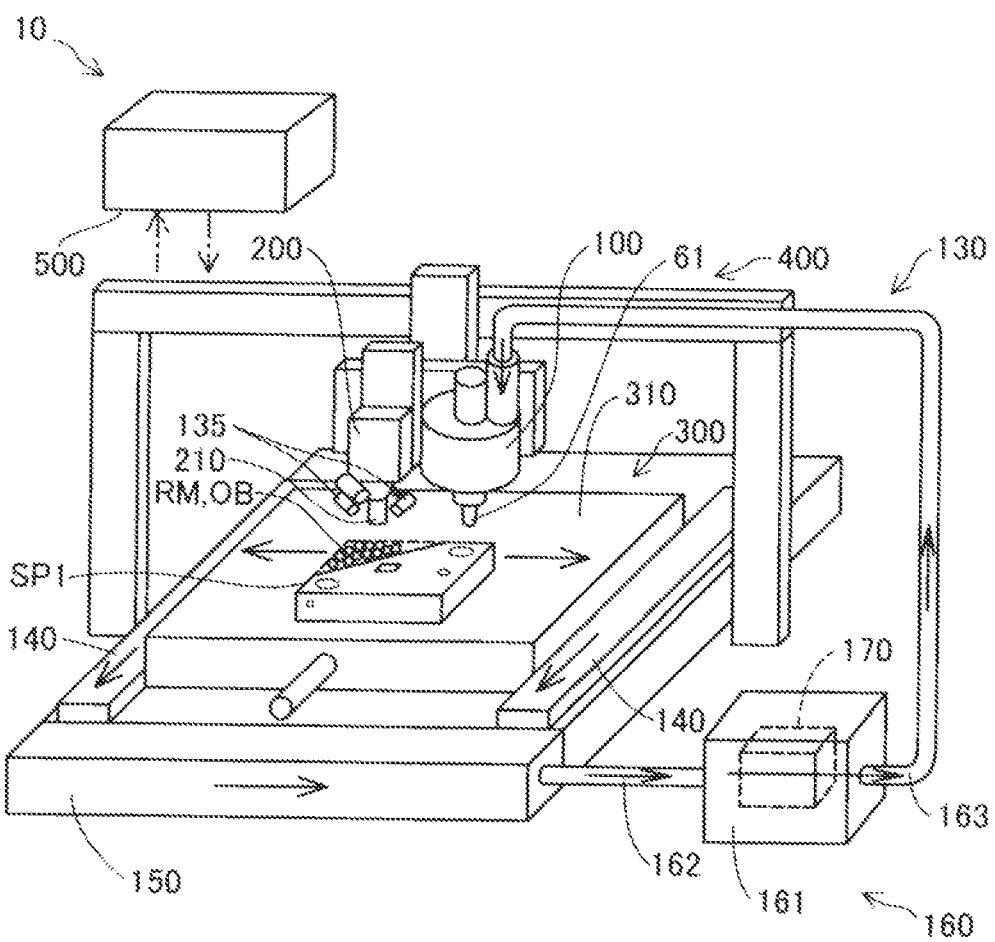
FIG. 8 is a diagram showing a state in which a first shaped product is cut in the shaping processing of the first embodiment.

FIG. 8 is a diagram showing a state in which the first shaped product SP1 is cut in step S110 of the shaping processing. The control unit 500 of the present embodiment controls the cutting unit 200 to cut the first shaped product SP1, thereby shaping reusable pellets RM, which are the reusable material. In the present embodiment, the control unit 500 controls the cutting unit 200 in the shaping of the reusable material as shown in step S110 of FIG. 7 in a modes different from that in the shaping of the shaped product as shown in step S104 of FIG. 5. Specifically, in step S110, under the control of the control unit 500, instead of using the cutting data, a distance between the cutting tool 210 and the first shaped product SP1 is measured by a position sensor provided in the cutting unit 200, and the cutting tool 210 is moved to bring the cutting tool 210 into contact with the first shaped product SP1 at a constant stroke to perform the cutting. Accordingly, the reusable pellets RM are scraped off from the first shaped product SP1 and shaped, and variations in a size and a shape of the shaped reusable pellets RM are prevented.

For example, the control unit 500 may use different cutting tools 210 for shaping the shaped product and shaping the reusable material. In this case, for example, the flat end mill may be used in the cutting of the shaped product, and the ball end mill may be used in the shaping of the reusable material. Further, a plurality of cutting tools 210 may be selectively used during the cutting. In other embodiments, for example, in step S110 of FIG. 7, the control unit 500 may shape the reusable material according to the cutting data, similarly to step S104 of FIG. 5. In this case, for example, after detecting a Z coordinate of the first shaped product SP1 by using a touch probe attached to the head distal end of the cutting unit 200 by the ATC, the control unit 500 may attach the cutting tool 210 such as the face mill to the head distal end by the ATC, and operate the cutting tool 210 at the constant stroke in the Z direction based on the detected Z coordinate of the first shaped product SP1 and the cutting data to shape the reusable pellets RM.

In step S120, the control unit 500 controls the transport unit 130 to transport the reusable pellets RM, which are the reusable material, to the plasticizing unit 30. In FIG. 8, a transport path of the reusable pellets RM by the transport unit 130 is indicated by solid line arrows. Specifically, the control unit 500 first controls the blower 135 to blow off the reusable pellets RM shaped in step S110 to the conveyor unit 140. Next, the control unit 500 controls and drives the conveyor unit 140 to transport the reusable pellets RM and input the reusable pellets RM into the recovery unit 150. Further, the control unit 500 controls the main body portion 161 of the pressure feeding unit 160 to suction the reusable pellets RM into the main body portion 161 via the first tube 162, and pressure-feed the reusable pellets RM suctioned into the main body portion 161 to the material supply unit 20 via the second tube 163. Further, the reusable pellets RM supplied to the material supply unit 20 are supplied to the plasticizing unit 30 via the communication path 22 shown in FIG. 2. In the present embodiment, the control unit 500 always drives the transport unit 130 during the shaping processing to transport the reusable material to the plasticizing unit 30. In other embodiments, for example, the control unit 500 may appropriately drive the transport unit 130 according to a timing at which the reusable material is shaped.

In step S120, the size of the reusable material is selected by the selecting unit 170 described above while the reusable material is transported to the plasticizing unit 30. Specifically, in the present embodiment, the reusable pellets RM having a dimension smaller than the mesh of the filter of the selecting unit 170 are easily transported to the plasticizing unit 30, and the reusable pellets RM having a dimension larger than the mesh of the filter are easily collected by the filter. Therefore, by providing the selecting unit 170, the dimension and an aspect ratio of the reusable pellets RM transported to the plasticizing unit 30 are easily maintained at certain values or less, and the reusable pellets RM are easily plasticized stably in the plasticizing unit 30. The size of the reusable material selected by the selecting unit 170 is determined by an experiment as, for example, a size according to a dimension of a path through which the reusable material passes before being plasticized, a size at which the plasticization of the reusable material in the plasticizing unit 30 is stabilized, and the like. For example, the selecting unit 170 may be configured to select the size of the reusable material not only to be equal to or less than a certain size but also to be in a range of equal to or higher than a certain size and be equal to or less than a certain size. Further, the reusable material collected by the selecting unit 170 may be, for example, collected and used for shaping processing of another shaped product or shaping in another shaping device.

In step S130, the control unit 500 controls the plasticizing unit 30 to plasticize the reusable material. Specifically, the reusable pellets RM transported to the plasticizing unit 30 in step S120 are plasticized by the plasticizing unit 30, and the reusable shaping material is generated. When the reusable shaping material is generated in step S130, at least the reusable material may be plasticized, and for example, when the reusable material is plasticized, a commercially available material different from the reusable material may be plasticized. That is, the reusable shaping material generated in step S130 may include, for example, a material generated by plasticizing the reusable material and a material generated by plasticizing the commercially available material.

In step S140, the control unit 500 uses the reusable shaping material to shape a second shaped product SP2. The second shaped product SP2 is a shaped product different from the first shaped product SP1. In the present embodiment, in addition to the reusable material shaped in step S110, the second shaped product SP2 shaped using the reusable material in step S140 can also be said to be the shaped object OB. In practice, step S130 and step S140 are executed in parallel.

In step S140, the control unit 500 controls the discharge unit 100 to discharge the reusable shaping material generated in step S130 to the stage 300, and controls the cutting unit 200 to cut a part of the reusable shaping material discharged onto the stage 300. Accordingly, similarly to the layer of the shaping material shown in FIG. 6, a layer of the reusable shaping material is formed, and the second shaped product SP2 is shaped. In step S140, the control unit 500 may cause the discharge unit 100 to discharge at least the reusable shaping material, and may cause the discharge unit 100 to discharge, for example, the reusable shaping material and the shaping material generated from the commercially available material. That is, at least a part of the second shaped product SP2 shaped in step S140 may be formed of the shaping material generated from the reusable material.

The shaping device 10 described above includes the cutting unit 200 that cuts the first shaped product SP1 or the intermediate component formed by adding the shaping material to the first shaped product SP1 on the stage 300 to shape the shaped object OB different from the first shaped product SP1 and the intermediate component. Therefore, the cutting unit 200 can easily reuse the first shaped product SP1 by remaking the first shaped product SP1 into the shaped object OB.

In the present embodiment, the first shaped product SP1 is the molding die used in the injection molding device, and contains the thermoplastic resin. Therefore, the first shaped product SP1 as the molding die can be easily reused by being remade into the shaped object OB. Further, by removing a shape and the like related to the cavity formed in the first shaped product SP1 by cutting, it is possible to increase a possibility that shape information of the molded object molded using the first shaped product SP1 can be concealed while easily reusing the first shaped product SP1.

Further, in the present embodiment, the control unit 500 controls the cutting unit 200 to shape the reusable material as the shaped object OB. Therefore, the first shaped product SP1 can be easily reused by remaking the first shaped product SP1 into the reusable material.

Further, in the present embodiment, the plasticizing unit 30 includes the rotor 40, the barrel 50, and the heater 58 that heats the material supplied between the rotor 40 and the barrel 50. Therefore, even when the reusable material is a fine powder, the reusable material can be stably plasticized by the plasticizing unit 30.

Further, in the present embodiment, the control unit 500 performs control such that the reusable shaping material generated by plasticizing the reusable material is discharged from the nozzle 61 to the stage 300, and a part of the reusable shaping material discharged onto the stage 300 is cut, thereby shaping the second shaped product SP2 different from the first shaped product SP1. Therefore, the first shaped product SP1 can be reused by being remade into the reusable material, and the second shaped product SP2 different from the first shaped product SP1 can be shaped using the reusable material.

In the present embodiment, the transport unit 130 that transports the reusable material to the plasticizing unit 30 is provided. Therefore, by driving the transport unit 130, the shaped reusable material can be efficiently transported to the plasticizing unit 30, and the reusable material can be efficiently generated by the plasticizing unit 30.

Further, in the present embodiment, the selecting unit 170 that selects the size of the reusable material is provided. Therefore, when shaping the second shaped product SP2, a plasticized state of the reusable shaping material can be stabilized by using the reusable material selected by the selecting unit 170, and a shaping quality of the second shaped product SP2 can be improved.

In the first embodiment, the first shaped product SP1 to be cut in the shaping processing is shaped in advance by the shaping device 10. In contrast, in other embodiments, the first shaped product SP1 may not be shaped by the shaping device 10. That is, before the shaping processing, the pre-shaping processing may not be executed. In this case, for example, a first shaped product SP1 shaped by another shaping device may be placed on the stage 300 by the user before step S110 shown in FIG. 7.

Further, in the first embodiment, in the shaping processing, the control unit 500 shapes the second shaped product SP2 using the reusable material. In contrast, in other embodiments, the control unit 500 may not shape the second shaped product SP2 in the shaping processing, and may, for example, end the shaping processing at a time point at which the reusable material is shaped as the shaped object OB from the first shaped product SP1. In this case, the reusable material shaped as the shaped object OB may be used, for example, in another shaping processing in the shaping device 10, or may be used in another shaping device. Further, in this case, for example, the size of the reusable material may be selected by the selecting unit 170 without being transported to the plasticizing unit 30 by the transport unit 130.

Here, the material used in the shaping device 10 described above will be described. In the shaping device 10, for example, the shaped product can be shaped using various materials such as a thermoplastic material, a metal material, and a ceramic material as a main material. Here, the "main material" refers to a material serving as a main component for forming the shape of the shaped product, and refers to a material having a content of 50% by weight or more in the shaped product. The above-described shaping material includes a material obtained by melting the main material alone or a material obtained by melting the main material and a part of components contained in the main material into a paste shape.

When the thermoplastic material is used as the main material, the plasticizing unit 30 generates the shaping material by plasticizing the thermoplastic material.

Examples of the thermoplastic material may include the following thermoplastic resin materials.

EXAMPLES OF THERMOPLASTIC RESIN MATERIAL

General-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polyether ether ketone (PEEK), polycarbonate (PC), modified polyphenylene ether, polybutylene terephthalate, and polyethylene terephthalate, and engineering plastics such as polysulfone, polyether sulfone, polyphenylene sulfide, polyarylate, polyimide, polyamideimide, polyetherimide, and polyether ether ketone An additive such as a wax, a flame retardant, an antioxidant, and a heat stabilizer may be mixed into the thermoplastic material, in addition to a pigment, a metal, and a ceramic. The thermoplastic material is plasticized, in the plasticizing unit 30, by the rotation of the rotor 40 and the heating of the heater 58 and is converted into a melted state.

It is desirable that the thermoplastic material is discharged from the nozzle 61 in a state in which the material is heated to a temperature equal to or higher than the glass transition point thereof and is melted completely. For example, when the ABS resin is used, it is desirable that a temperature is about 200° C. when the ABS resin is discharged from the nozzle 61.

In the shaping device 10, for example, the following metal material may be used as the main material instead of the above-described thermoplastic material. In this case, it is desirable that a component to be melted at the time of generating the shaping material is mixed into a powder material obtained by converting the following metal material into a powder, and then the mixture is put into the plasticizing unit 30 as a material MR.

EXAMPLES OF METAL MATERIAL

A single metal of magnesium (Mg), iron (Fe), cobalt (Co) or chromium (Cr), aluminum (Al), titanium (Ti), copper (Cu), and nickel (Ni), or an alloy containing one or more of these metals

EXAMPLES OF ALLOY

Maraging steel, stainless steel, cobalt chrome molybdenum, titanium alloy, nickel alloy, aluminum alloy, cobalt alloy, and cobalt chromium alloy In the shaping device 10, the ceramic material may be used as the main material instead of the above-described metal material. Examples of the ceramic material may include an oxide ceramic such as silicon dioxide, titanium dioxide, aluminum oxide, and zirconium oxide, and a non-oxide ceramic such as aluminum nitride. When the above-described metal material or ceramic material is used as the main material, the shaping material discharged onto the stage 300 may be cured by sintering.

A powder material of the metal material or the ceramic material to be charged into the material supply unit 20 as the material MR may be a mixed material obtained by mixing a plurality of types of powder of a single metal, powder of the alloy, and powder of the ceramic material. Further, the powder material of the metal material or the ceramic material may be coated with, for example, the thermoplastic resin shown in the above-described example, or a thermoplastic resin other than those in the above-described example. In this case, the thermoplastic resin may be melted in the plasticizing unit 30 to exhibit fluidity.

For example, the following solvents may be added to the powder material of the metal material or the ceramic material to be charged into the material supply unit 20 as the material MR. As the solvent, one kind or a combination of two or more kinds selected from the following may be used.

EXAMPLES OF SOLVENT

Water, (poly)alkylene glycol monoalkyl ethers such as ethylene glycol monomethyl ether, ethylene glycol monoethyl ether, propylene glycol monomethyl ether, and propylene glycol monoethyl ether, acetate esters such as ethyl acetate, n-propyl acetate, isopropyl acetate, n-butyl acetate, and iso-butyl acetate, aromatic hydrocarbons such as benzene, toluene, and xylene, ketones such as methyl ethyl ketone, acetone, methyl isobutyl ketone, ethyl-n-butyl ketone, diisopropyl ketone, and acetylacetone, alcohols such as ethanol, propanol, and butanol, tetraalkylammonium acetates, sulfoxide-based solvents such as dimethyl sulfoxide and diethyl sulfoxide, pyridine-based solvents such as pyridine, γ-picoline, and 2,6-lutidine, tetraalkylammonium acetates (such as tetrabutylammonium acetate), and ionic liquids such as butyl carbitol acetate In addition, for example, the following binders may be added to the powder material of the metal material or the ceramic material to be charged into the material supply unit 20 as the material MR.

EXAMPLES OF BINDER

Acrylic resin, epoxy resin, silicone resin, cellulose-based resin or other synthetic resins or polylactic acid (PLA), polyamide (PA), polyphenylene sulfide (PPS), polyetheretherketone (PEEK) or other thermoplastic resins

B. Second Embodiment

FIG. 9 is a process diagram showing shaping processing of the shaped object OB according to a second embodiment. In the present embodiment, the control unit 500 executes the shaping processing to shape a third shaped product SP3, which is a shaped product different from the first shaped product SP1 and an intermediate component, as the shaped object OB, instead of shaping a reusable material. That is, unlike the second shaped product SP2 in the first embodiment, the third shaped product SP3 is not shaped using the reusable material, but is shaped directly from the first shaped product SP1 or the intermediate component by cutting or adding the shaping material to the first shaped product SP1 or the intermediate component. In the configuration of the shaping device 10 of the second embodiment, points not particularly described are the same as those of the first embodiment.

In step S210, the control unit 500 controls the discharge unit 100 to discharge the shaping material to the first shaped product SP1 on the stage 300 and add the shaping material to the first shaped product SP1, thereby forming an intermediate component M.

FIG. 10 is a diagram showing a state in which the shaping material is added to the first shaped product SP1 in step S210. By executing step S210, as shown in FIG. 10, the shaping material is added to the first shaped product SP1, so that additional portions Ads are formed on the first shaped product SP1, and the intermediate component M is formed.

In step S220, the control unit 500 controls the cutting unit 200 to cut a part of the intermediate component M on the stage 300.

FIG. 11 is a diagram showing the third shaped product SP3 shaped by the shaping processing of the second embodiment. As shown in FIG. 11, by executing step S220, cut portions Ps, which are a part of the intermediate component M formed in step S210, are cut, and the third shaped product SP3 is shaped as the shaped object OB. In the present embodiment, the cut portions Ps are portions different from the additional portions Ads.

In other embodiments, for example, the control unit 500 may shape the third shaped product SP3 by cutting only a part of the additional portions Ads or cutting a part of the additional portions Ads and a part of a portion different from the additional portions Ads as a part of the intermediate component M. Further, for example, the cutting of the first shaped product SP1 corresponding to step S220 may be performed before the addition of the shaping material to the first shaped product SP1 corresponding to step S210. In this case, a part of the first shaped product SP1 is cut to form the first shaped product SP1 with a part being cut, and the shaping material is added to the first shaped product SP1 with a part being cut to shape the third shaped product SP3. Further, for example, the third shaped product SP3 may be shaped by appropriately and repeatedly executing steps S210 and S220.

Further, for example, cutting powder of the first shaped product SP1 cut in step S220 may be reused as the material. In this case, for example, similarly to the first embodiment, the cutting powder may be transported to the plasticizing unit 30 by the transport unit 130. Further, a size of the cutting powder may be selected by the selecting unit 170.

According to the shaping device 10 of the second embodiment described above, the first shaped product SP1 can be easily reused by being remade into a new shaped object as well. In particular, in the present embodiment, the control unit 500 controls the discharge unit 100 to form the intermediate component M by adding the shaping material to the first shaped product SP1 on the stage 300. Therefore, after the shaping material is added to the first shaped product SP1 to form the intermediate component M, the first shaped product SP1 can be easily reused by remaking the intermediate component M into the shaped object OB.

In other embodiments, the control unit 500 may shape the third shaped product SP3 by cutting the first shaped product SP1 on the stage 300 instead of cutting the intermediate component M. In this case, for example, the control unit 500 may cut the first shaped product SP1 on the stage 300 and shape the third shaped product SP3 by executing step S220 without executing step S210 of FIG. 9.

C. Other Embodiment (C-1) In the embodiments described above, the first shaped product SP1 is a molding die used in an injection molding device, and contains a thermoplastic resin. In contrast, the first shaped product SP1 may not be the molding die used in the injection molding device, and may not contain the thermoplastic resin.

(C-2) In the embodiments described above, the shaping device 10 includes the discharge unit 100. In contrast, the shaping device 10 may not include the discharge unit 100.

Therefore, the shaping device 10 may be configured to shape the shaped object OB only by, for example, cutting the first shaped product SP1 by the cutting unit 200.

(C-3) In the embodiments described above, the plasticizing unit 30 includes the rotor 40 and the barrel 50. In contrast, the plasticizing unit 30 may not include the rotor 40 and the barrel 50. For example, the plasticizing unit 30 may include an in-line screw that is rotated by a driving force of a motor. In this case, the plasticizing unit 30 may not include the barrel 50.

(C-4) In the embodiments described above, the shaping device 10 includes the transport unit 130. In contrast, the shaping device 10 may not include the transport unit 130. In this case, for example, a reusable material may be supplied to the plasticizing unit 30 via the material supply unit 20 by a user.

(C-5) In the embodiments described above, the shaping device 10 includes the selecting unit 170. In contrast, the shaping device 10 may not include the selecting unit 170.

D. Other Aspects

The present disclosure is not limited to the above-described embodiments, and can be implemented in various aspects without departing from the spirit of the present disclosure. For example, the present disclosure can be implemented by the following aspects. In order to solve a part or all of technical problems of the present disclosure, or to achieve a part or all of effects of the present disclosure, technical characteristics in the above-described embodiments corresponding to technical characteristics in each of aspects to be described below can be replaced or combined as appropriate. Further, the technical characteristics can be deleted as appropriate unless the technical characteristics are described as essential in the present specification.

(1) According to a first aspect of the present disclosure, a shaping device is provided. The shaping device includes: a cutting unit configured to cut a first shaped product or an intermediate component formed by adding a shaping material to the first shaped product on a stage; and a control unit configured to control the cutting unit to cut the first shaped product or the intermediate component to shape a shaped object different from the first shaped product and the intermediate component.

According to such an aspect, the first shaped product can be easily reused by remaking the first shaped product into the shaped object different from the first shaped product by the cutting unit.

(2) In the shaping device according to the aspect, the control unit may control the cutting unit to cut the first shaped product, which is a molding die used in an injection molding device and containing a thermoplastic resin, or the intermediate component formed by adding the shaping material to the molding die to shape the shaped object. According to such an aspect, by removing a shape and the like related to a cavity formed in the first shaped product by cutting, it is possible to increase a possibility that shape information of the molded object molded using the first shaped product can be concealed while easily reusing the first shaped product.

(3) In the shaping device according to the aspect, a discharge unit configured to discharge the shaping material to the stage may be provided, and the control unit may control the discharge unit to form the intermediate component by adding the shaping material to the first shaped product on the stage. According to such an aspect, after the shaping material is added to the first shaped product to form the intermediate component, the first shaped product can be easily reused by remaking the intermediate component into the shaped object.

(4) In the shaping device according to the aspect, a discharge unit configured to discharge the shaping material to the stage may be provided, the discharge unit may include a plasticizing unit configured to plasticize at least a part of the material to generate a shaping material, and the control unit may control the cutting unit to shape a reusable material, which is the material, as the shaped object. According to such an aspect, the first shaped product can be easily reused by remaking the first shaped product into the reusable material.

(5) In the shaping device according to the aspect, the plasticizing unit includes a rotor having a groove forming surface in which a groove is formed, a barrel having a facing surface facing the groove forming surface and having a communication hole formed in the facing surface, and a heater configured to heat the material supplied between the rotor and the barrel. According to such an aspect, even when the reusable material is a fine powder, the reusable material can be stably plasticized by the plasticizing unit.

(6) In the shaping device according to the aspect, the control unit is configured to control the discharge unit to plasticize the reusable material and discharge the plasticized reusable material to the stage, and control the cutting unit to shape a second shaped product different from the first shaped product by cutting a part of the plasticized reusable material discharged onto the stage. According to such an aspect, the first shaped product can be reused as the reusable material, and the second shaped product different from the first shaped product can be shaped using the reusable material.

(7) In the shaping device according to the aspect, a transport unit configured to transport the reusable material to the plasticizing unit may be provided. According to such an aspect, by driving the transport unit, the shaped reusable material can be efficiently transported to the plasticizing unit, and the reusable material can be efficiently plasticized by the plasticizing unit.

(8) In the shaping device according to the aspect, a selecting unit configured to select a size of the reusable material may be provided. According to such an aspect, when shaping the second shaped product, a plasticized state of the plasticized reusable material can be stabilized by using the reusable material selected by the selecting unit, and a shaping quality of the second shaped product can be improved.

(9) According to a second aspect of the present disclosure, a shaped object manufacturing method is provided. The manufacturing method includes: cutting, by a cutting unit, a first shaped product or an intermediate component formed by adding a shaping material to the first shaped product on a stage; and shaping a shaped object different from the first shaped product and the intermediate component.

According to such an aspect, the first shaped product can be easily reused by remaking the first shaped product into the shaped object different from the first shaped product by the cutting unit.

The present disclosure is not limited to the aspects of the shaping device and the shaped object manufacturing method described above, and can be implemented in various modes. For example, the present disclosure can be implemented as a method of controlling the shaping device, a computer program for shaping the shaped object, and the like.

What is claimed is:

1. A shaped object manufacturing method comprising:
depositing a first shaping material on a stage to form a first shaped product via a first head provided at a shaping device, the first shaped product being a first molding die for an injection molding device;
using the first shaped product in the injection molding device as the first molding die to form a molded object;
placing the first shaped product, which has been used in the injection molding device as the first molding die, on the stage;
further depositing a second shaping material on the first shaped product, which has been used in the injection molding device as the first molding die, to form a second shaped product on the first shaped product via the first head, the second shaped product being a projection;
cutting part of the first shaped product with the projection to form a third shaped product via a second head provided at the shaping device next to the first head, the third shaped product being a second molding die; and
using the third shaped product in the injection molding device as the second molding die to form a subsequent molded object.

2. The shaped object manufacturing method according to claim 1,
wherein the first shaped product contains a thermoplastic resin.

3. The shaped object manufacturing method according to claim 1,
wherein the first head includes a plasticizing mechanism configured to plasticize at least a part of a source material to generate the first shaping material, and the plasticizing mechanism includes a rotor and a barrel facing the rotor,
the source material is supplied into a gap between the rotor and the barrel to form the first shaping material by rotating the rotor relative to the barrel, and
a cut material in the cutting of the part of the first shaped product is a reusable material to reuse as the source material.

4. The shaped object manufacturing method according to claim 3,
wherein the plasticizing mechanism includes the rotor having a groove forming surface in which a groove is formed, the barrel having a facing surface facing the groove forming surface and a communication hole formed in the facing surface, and a heater configured to heat the source material supplied into the gap between the rotor and the barrel.

5. The shaped object manufacturing method according to claim 3, further comprising:
further depositing the second shaping material including the reusable material to form another product on the first shaped product after the cutting of the part of the first shaped product; and
cutting another part of the first shaped product with the projection and the another product to form the third shaped product,
wherein the plasticizing mechanism is configured to plasticize at least a part of the reusable material, and
the another part includes the plasticized reusable material.

6. The shaped object manufacturing method according to claim 5, further comprising:
transporting the reusable material from the stage to the plasticizing mechanism.

7. The shaped object manufacturing method according to claim 5, further comprising:
selecting a specific reusable material from the reusable material based on a size of the reusable material.

8. The shaped object manufacturing method according to claim 3, further comprising:
transporting the reusable material from the stage to the plasticizing mechanism; and
selecting a specific reusable material from the reusable material based on a size of the reusable material.

* * * * *